Patented Oct. 24, 1939

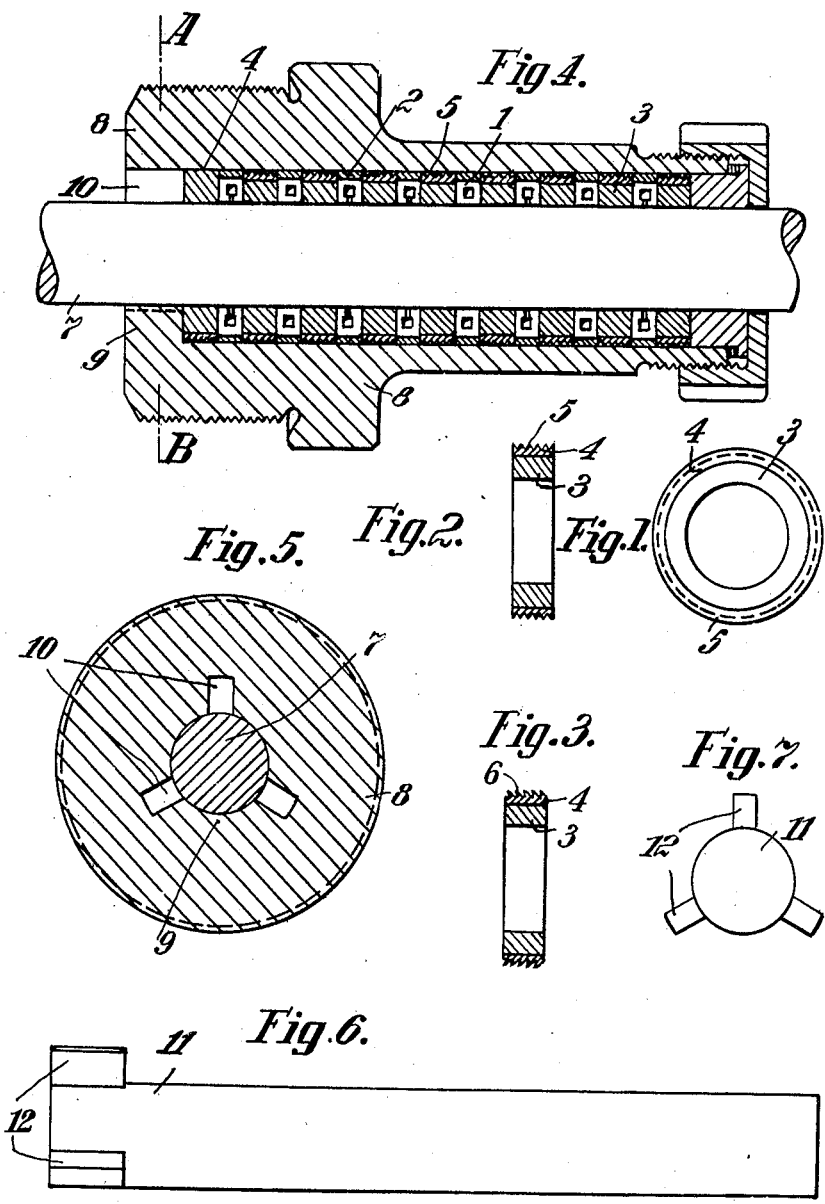

2,177,040

UNITED STATES PATENT OFFICE 2,177,040

HOLLOW CYLINDER OR RING FOR PACKINGS, BEARINGS, LININGS, AND THE LIKE

Gustav Huhn, Berlin-Tempelhof, Germany

Original application September 21, 1936, Serial No. 101,886. Divided and this application April 30, 1938, Serial No. 205,380. In Germany October 3, 1935

4 Claims. (Cl. 308—237)

This invention relates to hollow cylinders and rings of graphite carbon for packings, bearings, linings and the like.

Against the wide use of the well known graphite carbon rings for packings and the like stands the disadvantage, that these rings are so brittle that they easily break during use and must frequently be replaced at most applications. This inconvenience of the graphite carbon rings as used hitherto is obviated by my present invention.

This application is a division of my copending application Ser. No. 101,886, filed September 21, 1936, entitled Process of assembling packings, linings, and the like.

Substantially and in the first line my invention consists in a hollow cylinder or ring for packings, bearings, linings and the like, said cylinder or ring being composed of an outer cylindrical hollow part made from one piece of steel or any other resistant metal material and having considerable expanding capacity when heated, such as stainless steel, iron, bronze, and the like, and of an inner cylindrical hollow part made from graphite carbon, said inner part being straitly and tightly jacketed and compressed by said outer part. It has been proved by tests that a hollow graphite carbon cylinder or ring provided with a jacket of steel or the like in the indicated manner excels by a very high strength or resistance against breakage and therefore is applicable to many different purposes where hitherto the use of carbon rings or hollow cylinders was impossible.

The rings or the like according to my present invention are preferably manufactured in the way indicated in my above named copending patent application. According to this method a ring or hollow cylinder of graphite carbon, and an undivided metal ring (preferably steel) are combined by forming said graphite carbon and metal rings of such diameters that said graphite carbon ring cannot be inserted into said metal ring until the latter is enlarged diametrically and circumferentially by heating it to a high temperature. When the metal ring is heated to said high temperature, the graphite carbon ring is inserted into said heated metal ring. As the steel ring is expanded by said heating, it is very easy to press the graphite carbon ring into said steel ring. In order to secure a tight joint between both parts even at elevated working temperatures, the proportion of the outside diameter of the graphite carbon ring to the inner diameter of the steel ring is preferably chosen such that for inserting the graphite carbon ring into the steel ring the latter must be heated to a temperature higher than the highest working temperature which practically is to be regarded, for instance to red heat.

Furthermore it has been proved that by this kind of connection of the combined parts of the hollow cylinder or ring the graphite carbon ring is compressed by the steel ring or the like when the latter is cooled again. Due to this compression the inner diameter of the graphite carbon part of the combined ring or hollow cylinder at ordinary temperature is smaller than it was previously. If, however, the steel jacket expands again under the influence of heating, the carbon ring expands with it. The expansion of the latter, however, in no way is a direct effect of heating it, as carbon practically is not expanded at all by heating, but said expansion is a consequence of the heat expansion of the steel jacket encircling and compressing said graphite carbon ring. It will be seen therefrom that the graphite carbon ring is put under thrust during the manufacture of the combined ring and possesses such an elasticity as to expand again when the compression by the jacketed steel ring is relaxed during heating.

This unexpected property of the graphite carbon part is of very great importance for the different kinds of employment of the combined device. If it is to be used as a packing ring for reciprocating engines working with superheated steam of extreme pressure, and the piston of which makes a great many strokes, the inner diameter of the graphite carbon rings is chosen such that when mounted they will have a sliding fit on the rod. When the engine is started and by the action of the superheated steam the temperature rises strongly, on the one hand the steel rod expands but on the other hand also the steel jacket of the graphite carbon ring expands in proportion. Now as in the beginning the graphite carbon ring was held by the steel jacket under strong pressure and as this pressure is released correspondingly when the steel jacket expands, in spite of the heat expansion of the piston rod the friction between it and the inner surface of the graphite carbon ring does not become excessively high and therefore this ring is not broken and does not damage the rod. At the same time the excellent lubricating and sliding qualities of the graphite carbon ring become apparent. If the temperatures turn lower or go down in a certain degree, the rod and the steel jacket of the packing ring shrink adequately and the steel jacket compresses again the graphite carbon ring in proportion to the shrinking of the rod; therefore the tightening action by the graphite carbon ring is preserved in a most favourable manner.

Another field for the use of the described metal jacketed graphite carbon rings or hollow cylinders is the application as oilless bearings. In all tests made with the hitherto usual graphite carbon rings they proved to fit only where low pressures prevailed, but with strong stresses the carbon rings broke or disintegrated. Coppered carbon with its higher strength or resistance against breakage has in comparison with pure graphite carbon only a low lubricating power so that the use of coppered carbon rings as bearings for high temperature and heavy loads is out of question. But when graphite carbon rings or hollow cylinders jacketed with a resistant metal (steel or the like) according to my present invention are used as bearings neither disintegration nor cracking happens. A greater or smaller number of such rings may be used depending upon the needs and the load of the bearing. Of course it is necessary to fasten the rings, when using same, at the one side of the bearing just as in a stuffing box. Because of the lubricating and sliding properties of the graphite carbon, such bearings need no lubrication with oil, which is inopportune when that material is used. Instead of arranging a number of metal jacketed graphite carbon rings side by side, one single hollow cylinder of corresponding height may be used.

Further the metal-jacketed graphite carbon ring or hollow cylinder may be used most advantageously as a lining for cylinders of reciprocating steam engines, air compressors, internal combustion engines and the like. For this purpose the rings may be arranged and adjusted in the cylinder just as indicated above for the formation of the oilless bearing, or in any other way, e. g., by exact axially fitting. In this case, too, instead of a number of grapite carbon rings arranged side by side, a hollow cylinder of graphite carbon jacketed with steel or the like and of adequate height equal to the stroke of the pistons, may be utilized. Thus an oilless cylinder is produced, wanting no oil supply at all, and the extraordinary large quantities of lubricating oil hitherto necessary for the piston and cylinder are not required. Also instead of the cast iron piston rings used hitherto, rings of high grade steel may be utilized, which being breakproof may be manufactured much narrower than the cast iron rings used hitherto.

Some embodiments of my invention are illustrated in the accompanying drawing. In the drawing Fig. 1 shows a view of a ring produced according to my invention, Fig. 2 a cross section through this ring, Fig. 3 a cross section through another form of the ring, Fig. 4 a stuffing box provided with such rings, Fig. 5 a section taken on line A—B of Fig. 4, Fig. 6 the side view of an auxiliary tool and Fig. 7 an end view thereof.

In all the embodiments shown the graphite carbon part of the ring is marked with 3, its metal jacket with 4. As shown in the drawing this metal jacket on its outer surface is provided with dents, points or sharpened fins or ribs 5. By this arrangement the adjustment of the rings in the packing chamber, bearing housing, cylinder or the like is facilitated and improved. The interstices between the dents or ribs 5 may be caulked with graphite or the like to improve still the seal. Whereas according to Fig. 2 the dents 5 stand radially, they may also be arranged in an oblique direction, as shown in Fig. 3 for the dents 6. By this latter arrangement the elasticity between the cylinder casing and the jacketed ring is increased.

In the stuffing box shown in Figs. 4 and 5 the jacketed graphite carbon rings 3, 4 are arranged alternating with hollow copper rings 1, filled in a known manner with graphite and equally surrounded with covering rings 2 of steel or the like.

The removal or replacement of the very small packings from the stuffing box of a reciprocating steam engine working with superheated steam of extreme pressure is very difficult and this operation can be made only from the interior of the packed cylinder. To facilitate the removal of the packing, the bottom 9 of the packing chamber or stuffing box 8 is provided with a number of slots 10 (Figs. 4 and 5) in a suitable arrangement. If the packing is to be removed, first the piston not shown is drawn out with the piston rod 7, after the latter is disengaged from its cross head also not shown. Then the cover of the stuffing box 8 is removed and the stripping tool 11 (Figs. 6 and 7) is introduced from the cylinder side into the interior of the stuffing box 8. This stripping tool 11 is provided at one end with fins or ribs 12 of equal arrangement and spacing with the slots 10 of the bottom, in such a manner that these ribs 12 of the tool 11 can be introduced through said slots 10 into the interior of the stuffing box 8. By striking with a hammer the other end of the tool 11 the packing composed of the alternating rings 3, 4 and 1, 2, respectively, is driven forward as a whole out of the packing chamber. As the steel jackets 4 of the graphite carbon rings 3 during this action abut on the steel jackets 2 of the copper rings 1, any damage to the graphite carbon parts 3 or to the copper parts 1 is prevented.

As stated above the described and illustrated stuffing box packing is preferably suited for the modern reciprocating steam engines working with superheated steam of extreme pressure, especially such of steam cars where the number of strokes of the piston is very high (about 1000 a minute), so that because of the prevailing high temperatures other packing materials are out of question. Asbestos cord packings are quickly disintegrated by the action of a temperature of about 450° C. and 100 atms. and the rod would be worn out very rapidly. Soft metal packings are out of question owing to the high temperature and solid packings of a heat resisting material like bronze, copper and the like want an excellent lubrication, which in such engines meets with difficulties, since even the very best cylinder oil evaporates or decomposes at the temperatures encountered. The same is to be remarked if cast iron or similar elastic rings are used. Furthermore there is the inconvenience that very wide chambers are needed which is impracticable for engines of the kind in question owing to their small dimensions. By the type of packings described before, a complete tightness is obtained with long durability of packing and rod and without any application of lubricating oil. Furthermore the jacketed graphite carbon rings fulfill the particular purpose, to bear the piston and the rod of the generally horizontally operating engines. Consequently, no special bearing basis rings are required here, which moreover under the great number of strokes and the high temperatures very rapidly would be ground out. Any grinding of the piston in the cylinder is rendered impossible by the bearing action of the jacketed graphite carbon rings.

Therefore, if such a packing is used the piston rings may act freely, and this is of great importance since the cylinder oil supplied to the piston, if needed, has only little lubricating power owing to the high temperatures.

Also, in case the jacketed graphite carbon rings or hollow cylinders are to be used for oilless bearings or for cylinder linings, the metal jackets may have points, dents, ribs or the like on their outer surfaces, as shown in Figs. 2 and 3 in connection with the packing rings.

Of course, such jacketed graphite carbon rings or hollow cylinders may be used for the packing and for the cylinder linings of one and the same engine. Engines fitted in this manner need no oil lubrication at all.

Having now particularly described and ascertained the nature of my said invention, I declare that what I claim is:

1. A hollow cylinder to be used as packing ring for stuffing boxes, as a bearing, cylinder lining for steam engines and the like, comprising an outer cylindrical hollow part composed of a resistant metal material expanding when heated, said outer cylindrical hollow part being made in one undivided piece, and an inner cylindrical hollow part composed of graphite carbon, said inner graphite carbon part being tightly encircled by said outer part and compressed by it, said metallic outer part being provided with dents on its outer surface.

2. A ring for packing purposes, cylinder linings, bearings and the like, comprising an outer ring part composed of a resistant metal material considerably expanding when heated, said outer ring part being made in one undivided piece, and an inner ring part composed of graphite carbon, said inner ring part being tightly encircled by said outer part and compressed by it, said metallic outer ring being provided with dents on its outer surface, said dents forming oblique angles to the radial directions of said ring.

3. A hollow cylinder or ring to be used as a packing for stuffing boxes, as a bearing, cylinder lining for steam engines and the like, comprising an outer cylindrical hollow part composed of a metal having a high rate of thermal expansion, said outer cylindrical part being made in one undivided piece, and an inner cylindrical hollow part composed of graphite carbon, said graphite carbon having substantially no heat expansion, said outer metal part being shrunk diametrically and circumferentially on said inner carbon part, tightly encircling the latter and storing both diametrical and circumferential compressions in said inner carbon part.

4. A one-piece undivided graphite carbon ring or cylinder, and a one-piece undivided metal ring or cylinder shrunk around said graphite carbon ring or cylinder and holding the latter under both circumferential and diametrical compression, said compression being so intense that heat-expansion of the metal ring or cylinder and heat-expansion of the part to be surrounded by said graphite carbon ring or cylinder, will be accompanied by expansion of said graphite carbon ring or cylinder under the influence of the compression stored therein even though this part cannot expand appreciably under the influence of heat.

GUSTAV HUHN.